US006364160B1

(12) United States Patent
Kim

(10) Patent No.: US 6,364,160 B1
(45) Date of Patent: Apr. 2, 2002

(54) DEVICE AND METHOD FOR INSTALLING BOTTLE IN DISPENSING UNIT WITH MINIMAL SPILLAGE

(76) Inventor: Daniel Kim, 26 Winchester Dr., Freehold, NJ (US) 07728

( * ) Notice: Subject to any disclaimer, the term of this patent is extended or adjusted under 35 U.S.C. 154(b) by 0 days.

(21) Appl. No.: 09/603,171

(22) Filed: Jun. 23, 2000

(51) Int. Cl.[7] ................................................ G01F 11/00
(52) U.S. Cl. ......................... 222/1; 222/185.1; 222/561
(58) Field of Search ......................... 222/1, 185.1, 559, 222/561

(56) References Cited

U.S. PATENT DOCUMENTS 2,006,484 A * 7/1935 Schooley .................... 222/561
3,643,704 A * 2/1972 Carr ........................... 222/561
5,083,672 A * 1/1992 Lewandowski ............. 222/561
5,513,777 A * 5/1996 Yoda et al. ................. 222/561
5,829,638 A * 11/1998 Lucas ...................... 222/185.1

* cited by examiner

*Primary Examiner*—Joseph A. Kaufman

(57) ABSTRACT

A bottle cap is described that includes a sleeve for receiving the neck of a bottle. A gate is slidably mounted in a frame across the top of the sleeve, the gate being slidable between a closed position in which the gate is watertight and an open position in which an aperture in the frame is exposed to allow the flow of liquid therethrough. A strap extends from the gate for moving the gate from its closed position to its open position.

9 Claims, 8 Drawing Sheets

DEVICE AND METHOD FOR INSTALLING BOTTLE IN DISPENSING UNIT WITH MINIMAL SPILLAGE

BACKGROUND OF THE INVENTION

1. Field of the Invention

The present invention relates generally to improvements in water dispensing units, and particularly to advantageous aspects of a device and method for installing a water bottle into a dispensing unit with minimal spillage.

2. Description of the Prior Art

In today's increasingly sophisticated office and home environments, people are no longer satisfied with drinking tap water. The main reasons for this are taste and health. Depending upon the locale, tap water may have an undesirable metallic or mineral taste. Further, again depending upon the locale, the tap water may contain pollutants, microorganisms, and other pathogenic agents that people wish to avoid.

Instead of drinking tap water, many consumers purchase spring water or purified water. As illustrated in FIG. 1, one common method of purchasing large quantities of water is in the form of a five-gallon bottle 1 that is placed into a dispensing unit 2 in an inverted configuration. A dispensing unit 2 typically provides refrigeration of the water and sometimes also provide heated water for hot beverages. Water 3 is gravity-fed from the bottle 1 into a well 4 inside the dispensing unit 2. As needed, water 3 is drawn from the well 4 through a spigot 5 located at the front of the dispenser 2, and additional water 3 is then drawn by gravity into the well 4 to replace the water 3 that has been removed.

One significant problem in this dispensing technique is the installation of the water bottle 1 into the dispensing unit 2. This tends to be a cumbersome process, particularly where the person installing the water bottle does not have sufficient height or upper body strength to properly control the bottle 1. A five-gallon bottle filled with water weighs over 40 pounds and can be quite unwieldy. Typically, the person installing the water bottle first removes the cap of the water bottle. The person then lifts the water bottle above the dispensing unit and attempts to invert the water bottle such that the opening of the water bottle is properly seated in the well of the dispensing unit. However, if the water bottle is not inverted and seated into the well with sufficient speed and accuracy, water tends to spill out of the bottle onto the dispensing unit, the floor, and any surrounding furniture, papers, persons, etc. In addition to wasting water and damaging nearby items, this also results in a loss of productivity, as valuable employee time must now be used to clean up the spillage.

There is thus a need for a device and method for installing a water bottle into a dispensing unit with minimal spillage.

SUMMARY OF THE INVENTION

These and other issues raised by the prior art are addressed by the present invention, one aspect of which provides a bottle cap, comprising a sleeve for receiving the neck of a bottle; a gate slidably mounted in a frame across the top of the sleeve, the gate being slidable between a closed position in which the gate is watertight and an open position in which an aperture in the frame is exposed to allow the flow of liquid therethrough; and a strap extending from the gate for moving the gate from its closed position to its open position.

Additional features and advantages of the present invention will become apparent by reference to the following detailed description and accompanying drawings.

DETAILED DESCRIPTION

A first aspect of the present invention provides a water bottle cap that includes a gate having a closed position in which the bottle cap is watertight and an open position in which water may flow through the cap. The gate is moved from its closed position to its open position by pulling on a strap. A water bottle having a bottle cap according to the present invention is inverted and installed into a dispensing unit with the gate in its closed position. Once the bottle has been properly positioned in the dispensing unit, the strap is then pulled to move the gate into its open position. According to a further aspect of the invention, once the water bottle is empty, the bottle cap may be removed for use in installing another water bottle. As a preliminary matter, it should be noted that although the present discussion revolves around the use of water bottles and dispensers, the present invention may also be used in connection with the dispensing of beverages and liquids in which large bottles are inverted for installation in a dispensing unit.

Figure 1:
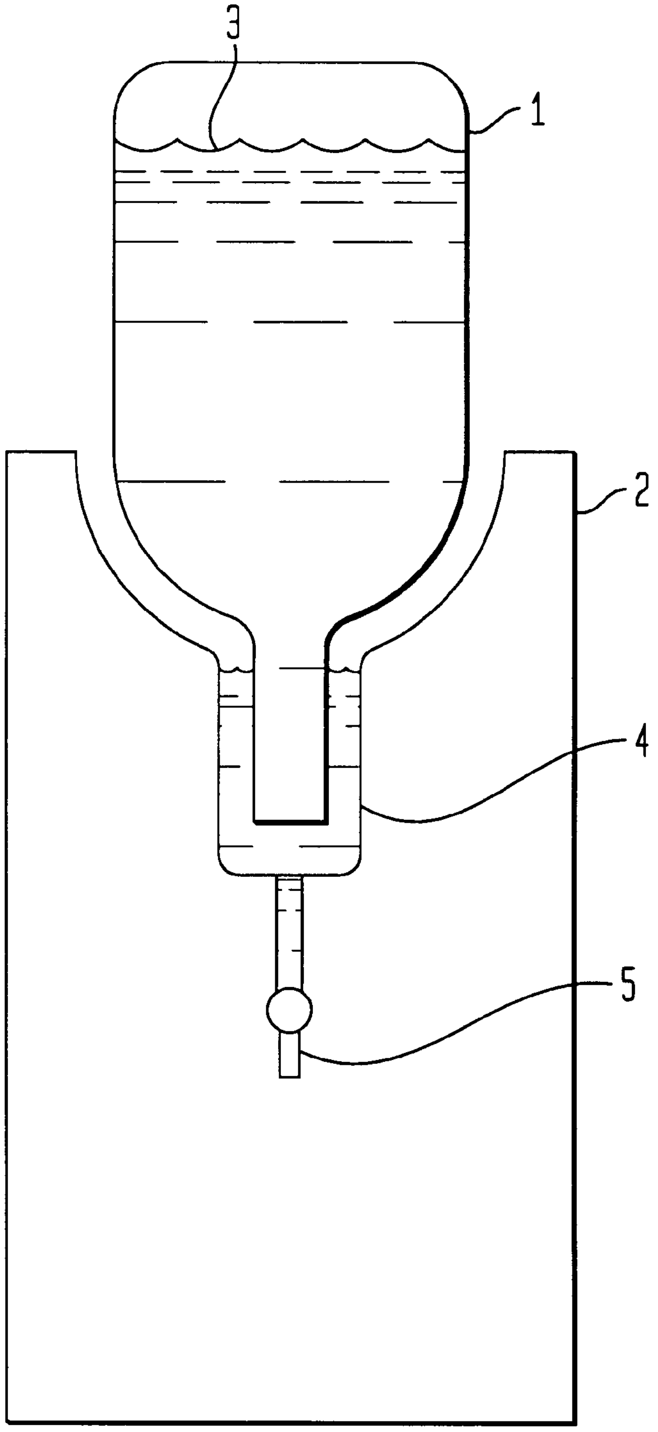
FIG. 1 (PRIOR ART)
FIG. 1 shows a diagram of a water bottle and dispenser according to the prior art.
Figure 2:
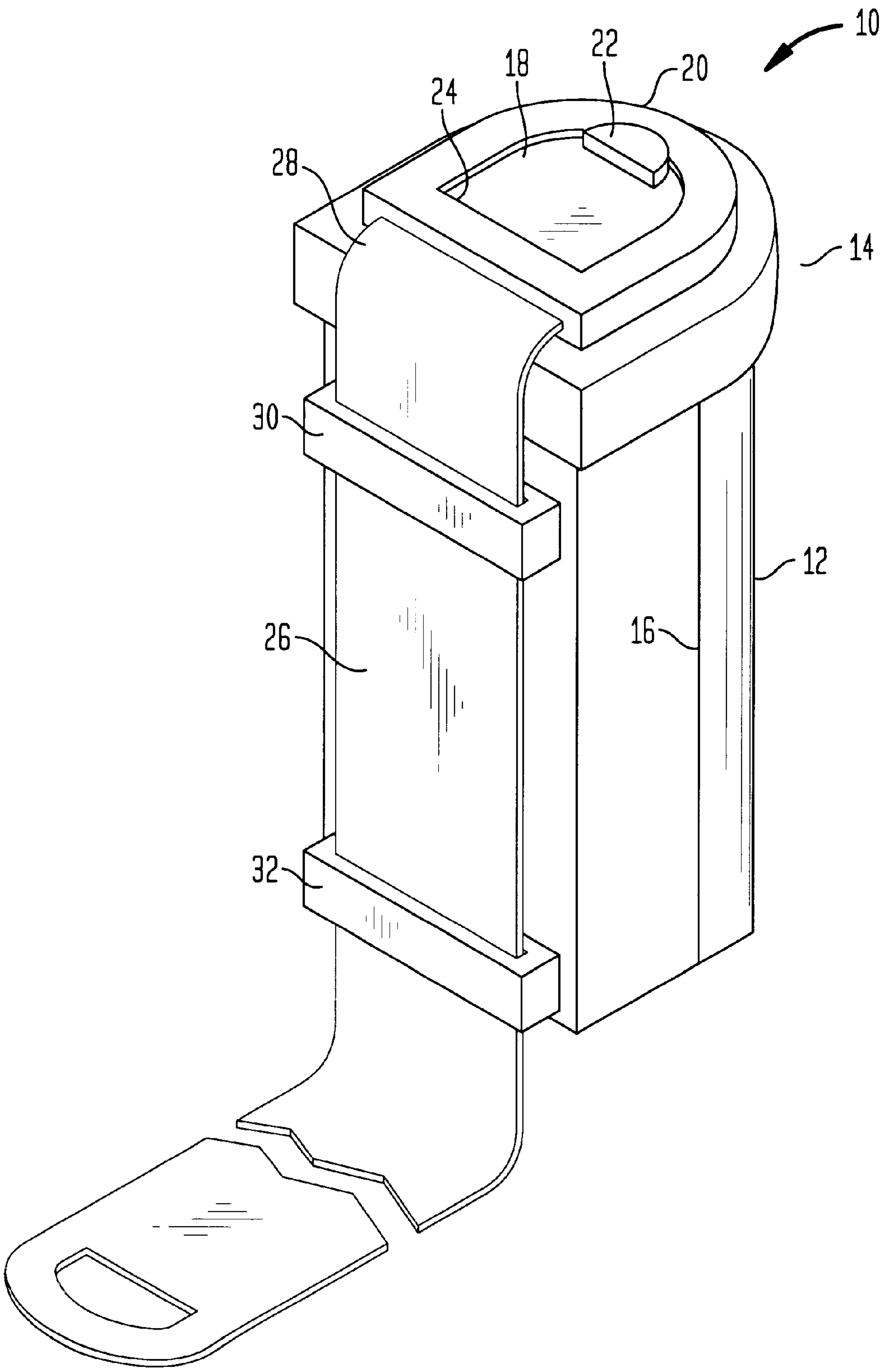
FIG. 2 shows a perspective view of a first embodiment of a bottle cap according to the present invention.

FIG. 2 shows a perspective view of a first embodiment of a water bottle cap 10 according to present invention. According to this embodiment of the invention, the bottle cap 10 is fabricated from a resilient plastic or other suitable material that can form a watertight seal with the neck and opening of a water bottle. As shown in FIG. 2, the bottle cap 10 includes a sleeve 12 that is dimensioned to fit closely around the neck of the water bottle. At the top of the sleeve 12 is a lip 14 that is dimensioned to fit closely around a corresponding lip portion at the opening of the water bottle. The sleeve 12 includes a flap 16 that, as described in greater detail below, is detached from the sleeve and rolled back to facilitate the seating of the lip 14 onto the lip of the water bottle and the sleeve 12 around the neck of the water bottle. Once the lip 14 and sleeve 12 are properly seated, the flap 16 is then rolled back into position and reattached, locking the cap into position. As described further below, the flap 16 is attached to the sleeve 12 using interlocking ribs or other technique that creates a watertight seal at the flap 16. It should be noted, however, that if a suitably elastic material is used to fabricate the bottle cap 10, it would be possible to eliminate the flap 16 entirely and instead stretch the base of the sleeve 12 to fit over the lip of the bottle and then work the sleeve 12 downward over the neck of the bottle until the lip of the bottle is properly seated in the lip 14 of the bottle cap 10.

At the top of the bottle cap 10, across the sleeve 12, is a retractable gate 18 that is slidably mounted inside a frame 20, such that the gate 18 and frame 20 are watertight when the gate 18 is in its initial, closed position. As described below, this can be accomplished by providing suitable grooves in the sides of the frame 20 that are dimensioned to closely receive the gate 18. In the present embodiment of the invention, the frame 20 is integrally formed with the sleeve 12. However, the frame may also be fabricated separately and then attached to the sleeve 12 without departing from the spirit of the invention.

The gate 18 includes a projection 22 that serves two functions. First, the projection 22 functions as a stop to prevent the gate 18 from being pulled all of the way out of the frame 20 by coming into contact with a crossbar 24 of the frame 22. This position of the gate 18 is hereinafter referred to as the "open" position. Second, the projection 22 functions as a knob to facilitate the sliding of the game 18 back into its initial, closed position in the frame 20.

Extending downward from the gate 18 is a pull strap 26 that is threaded through an exit slot 28 in the frame 20. As its name implies, the pull strap 26 is used to pull the gate 18 out of its closed position into its open position. The movement of the gate 18 and strap 26 is limited by the projection 22 bumping up against the crossbar 24. The pull strap 26 is guided downward alongside the sleeve 12 by a pair of slotted guides 30 and 32 that protrude from one side of the sleeve 12. The pull strap 26 terminates in a handle 34 that is used to exert downward pressure of the pull strap 26 to pull the gate 18 into its open position. Although a pair of guides 30 and 32 is shown, it would be possible to use more than two guides or a single guide without departing from the spirit of the present invention. In the present embodiment of the invention, the guides 30 and 32 are integrally formed with the sleeve 12. However, the guides may be fabricated separated without departing from the spirit of the invention.

Figure 3:
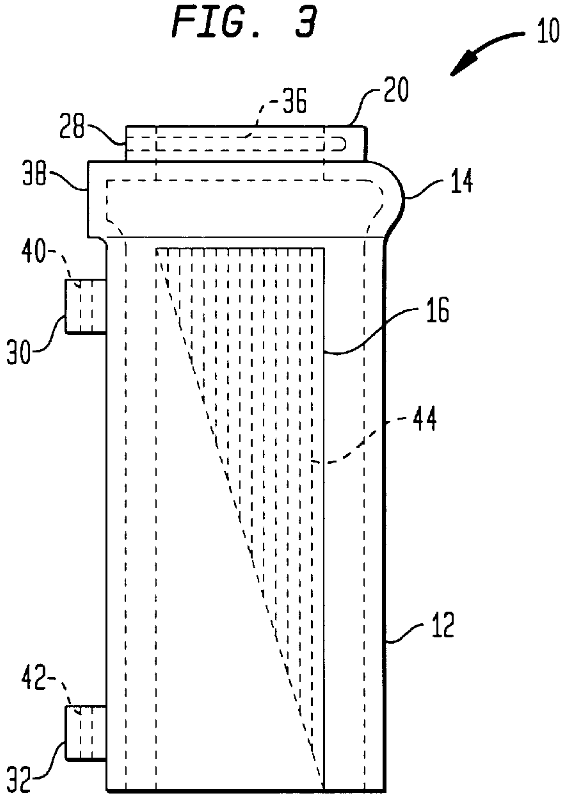
FIG. 3 shows a side view of the bottle cap shown in FIG. 2, with the gate and pull strap removed for purposes of illustration.
Figure 4:
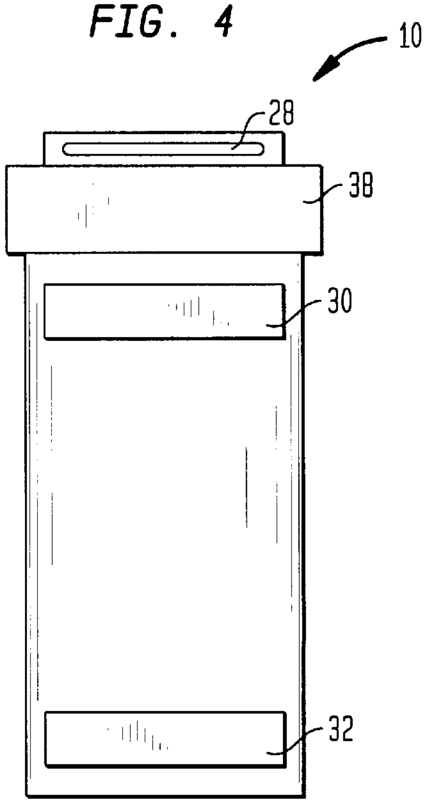
FIG. 4 shows a side view of the bottle cap rotated 90 degrees from the side view shown in FIG. 3.

FIG. 3 shows a side view of the water bottle cap 10 with the gate 18 and pull strap 26 removed for purposes of illustration. The gate 18 is slidably mounted in a slot 36 (shown in broken lines) in the frame 20 that is defined by a series of grooves around the inner perimeter of the rounded portion of the frame 20. The gate 18 communicates with the pull strap 26 at the outside of the frame 20 through exit slot 28. Lip 14 includes a rounded shoulder 38 that is used to provide a friction-reducing guiding surface for the pull strap 26 as it pulls the gate 18 into its open position. As mentioned above, the pull strap 26 is threaded through slots 40 and 42 in guides 30 and 32. The relationship between the frame 20, exit slot 28, shoulder 38, and guides 30 and 32 can better be understood with reference to FIG. 4, which is the view shown in FIG. 2 rotated by 90 degrees.

Figure 5:
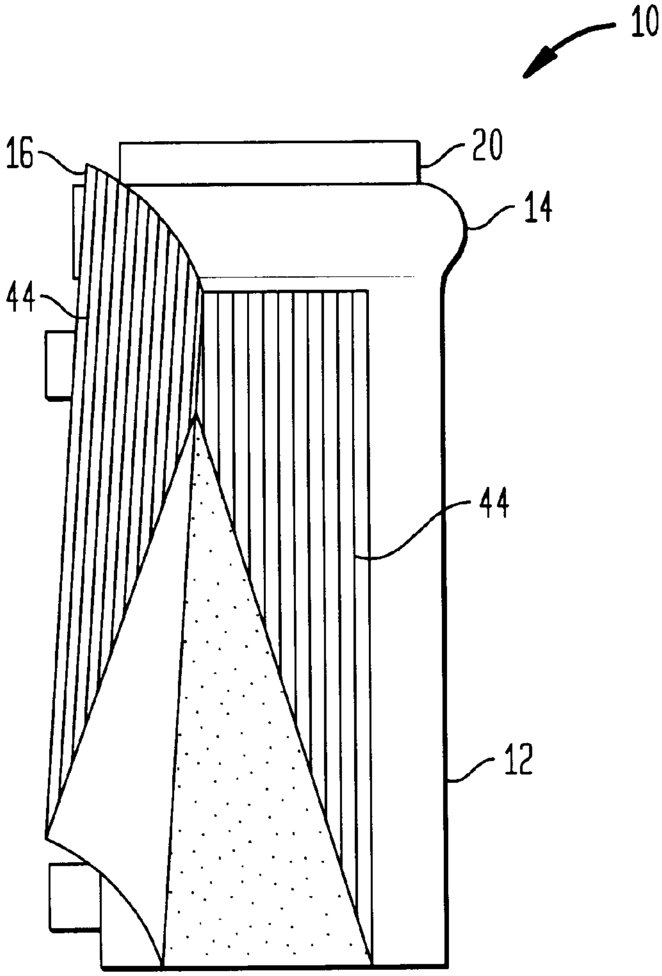
FIG. 5 shows the side view of FIG. 3 with the bottle cap flap detached from the sleeve and rolled back.
Figure 6:
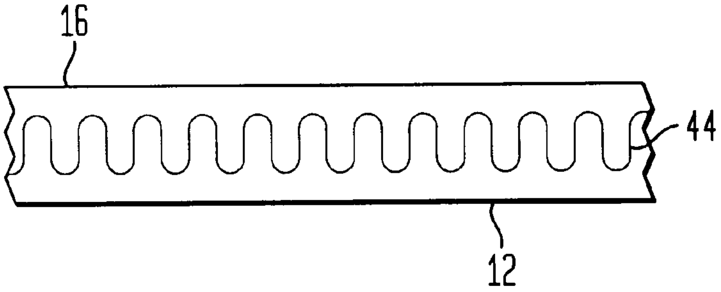
FIG. 6 shows a diagram of the interlocking rib structure used to attach the flap to the sleeve.

As mentioned above, flap 16 is detachably mounted to the sleeve 12 to facilitate the positioning of the bottle cap 10 onto the neck of the water bottle. As shown in FIG. 3, the flap 16 is attached to the sleeve 12 by a series of interlocking ribs 44 (illustrated in broken lines) that are integrally formed, respectively, on the inner surface of the flap 16 and the outer surface of the sleeve 12. In order to facilitate the placement of the sleeve 12 onto the water bottle, the sleeve 12 is cut away underneath the flap 16. The cutaway portion of the sleeve can better be seen with reference to FIG. 5, which shows the view of FIG. 3 with the flap 16 detached from the sleeve 12 and rolled back. FIG. 6 is a diagram illustrating the interlocking ribs 44 that are used to detachably mount the flap 16 to the sleeve 12. Other techniques may be used to detachably attack the flap 16 to the sleeve 12 without departing from the spirit of the invention.

Figure 7:
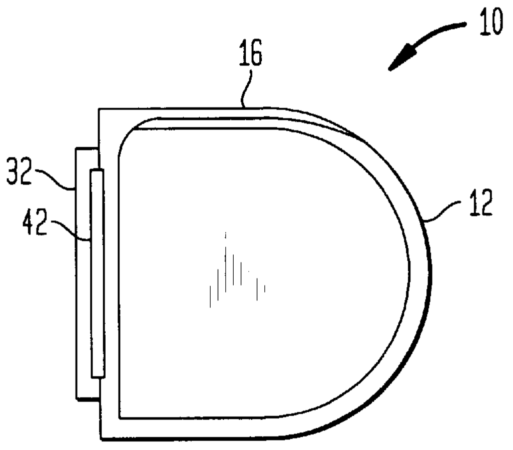
FIG. 7 shows a bottom view of the bottle cap shown in FIG. 3.

FIG. 7 shows a bottom view of the bottle cap 10. As shown in FIG. 7, the interior of the sleeve 12 is round to accommodate a round water bottle neck. However, of course, different shapes may be used for the interior of the sleeve 12 for different bottle neck shapes, such as a neck shape with a square profile.

Figure 8:
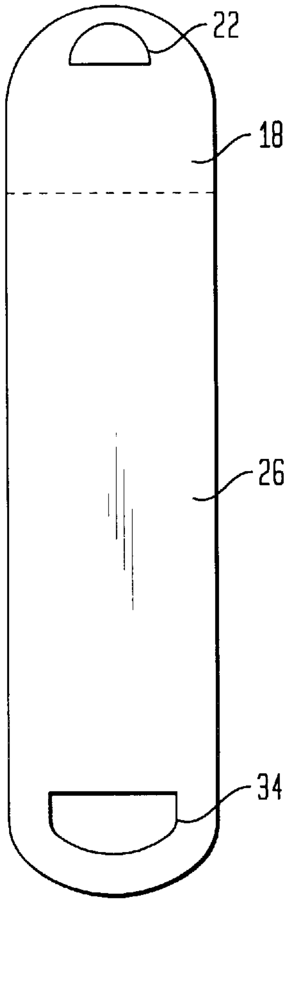
FIG. 8 shows a plan view of the gate and pull strap used in the bottle cap shown in FIG. 2.

FIG. 8 is a plan view of the gate 18 and pull strap 26, separated from the bottle cap 10. As shown in FIG. 8, in the present embodiment of the invention, the gate 18, projection 22, pull strap 26 and handle 34 are fabricated from a continuous piece of material. (For purposes of illustration, a broken line has been inserted to shown the delineation between the gate 18 and the pull strap.) However, it would also be possible to construct some or all of these components using separate pieces of material without departing from the spirit of the present invention.

Figure 9A:
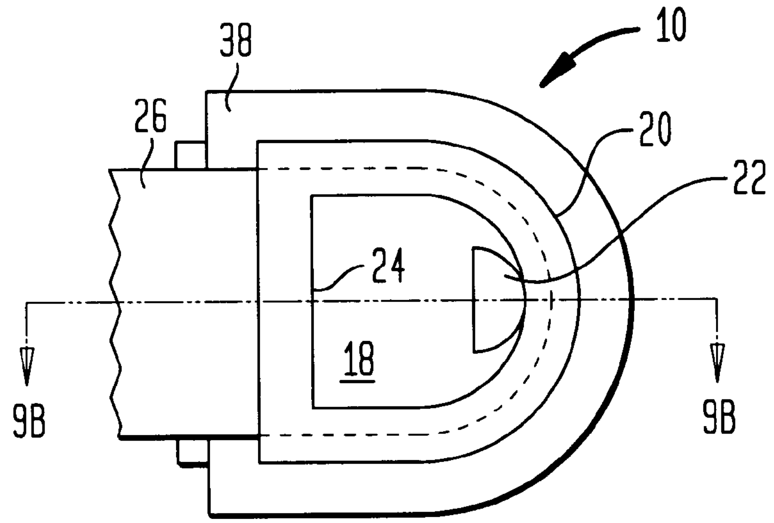
FIG. 9A shows a top view of the bottle cap shown in FIG. 2 with the gate in its closed position.
Figure 9B:
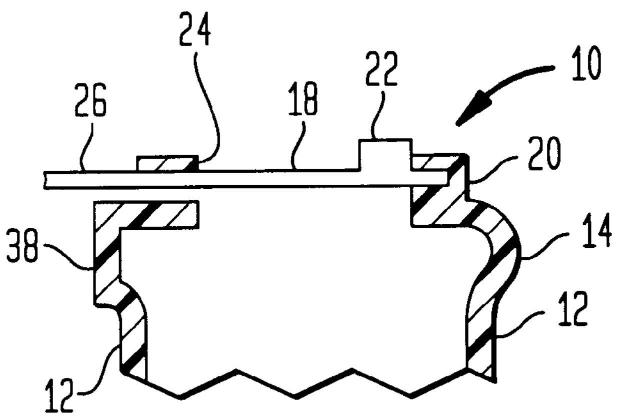
FIG. 9B shows a cross section of the bottle cap through the plane 9B—9B in FIG. 9A.
Figure 10A:
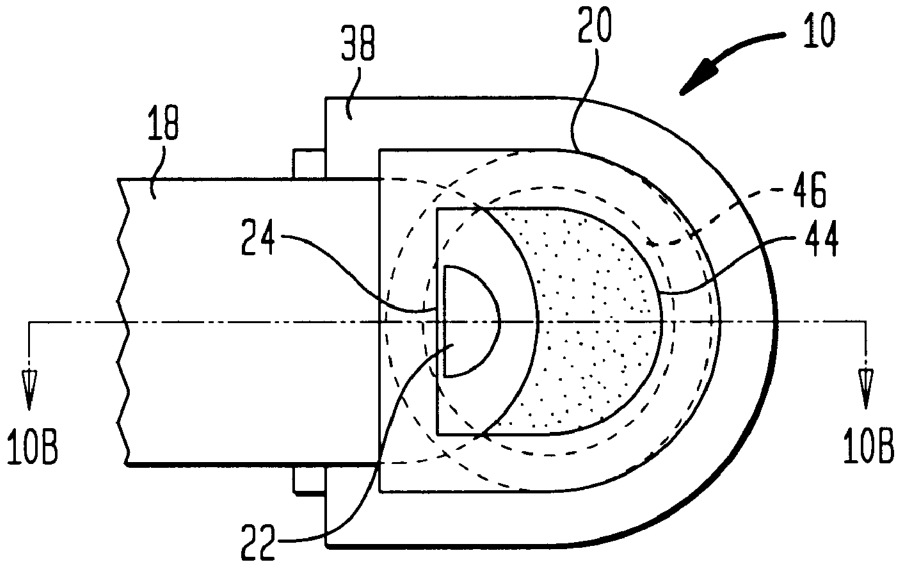
FIG. 10A shows a top view of the bottle cap shown in FIG. 2 with the gate in its open position.
Figure 10B:
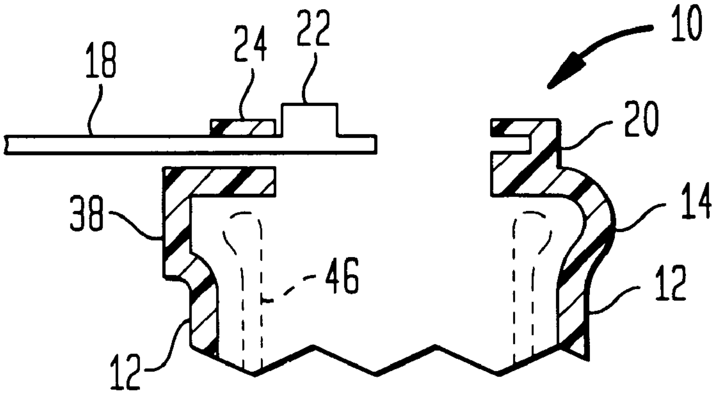
FIG. 10B shows a cross section of the bottle cap through the plane 10B—10B in FIG. 10A.

FIG. 9A shows a top view of the bottle cap 10 with the gate 18 in its initial, closed position, and FIG. 9B shows a cross section of the view shown in FIG. 9A through the plane 9B—9B. FIG. 10A shows a top view of the bottle cap 10 with the gate 18 in its second, open position, and FIG. 10B shows a cross section of the view shown in FIG. 10A taken through the plane 10B—10B. FIGS. 9A–B and 10A–B illustrate in greater detail the operation of the bottle cap 10. As shown in FIGS. 9A and 9B, when the gate 18 is in its initial, closed position, projection 22 abuts the curved portion of the frame 20. Pulling on the pull strap 26 causes the gate 18 to move towards the left, until projection 22 butts up against the frame crossbar 24, thereby exposing a central aperture 44 (FIG. 10A) in the bottle cap 10. The central aperture 44 is dimensioned to be sufficiently large such that water may flow freely through the bottle cap 10, as needed. For purposes of illustration, in FIGS. 10A and 10B, the mouth of a water bottle has been shown in broken lines.

Figure 11:
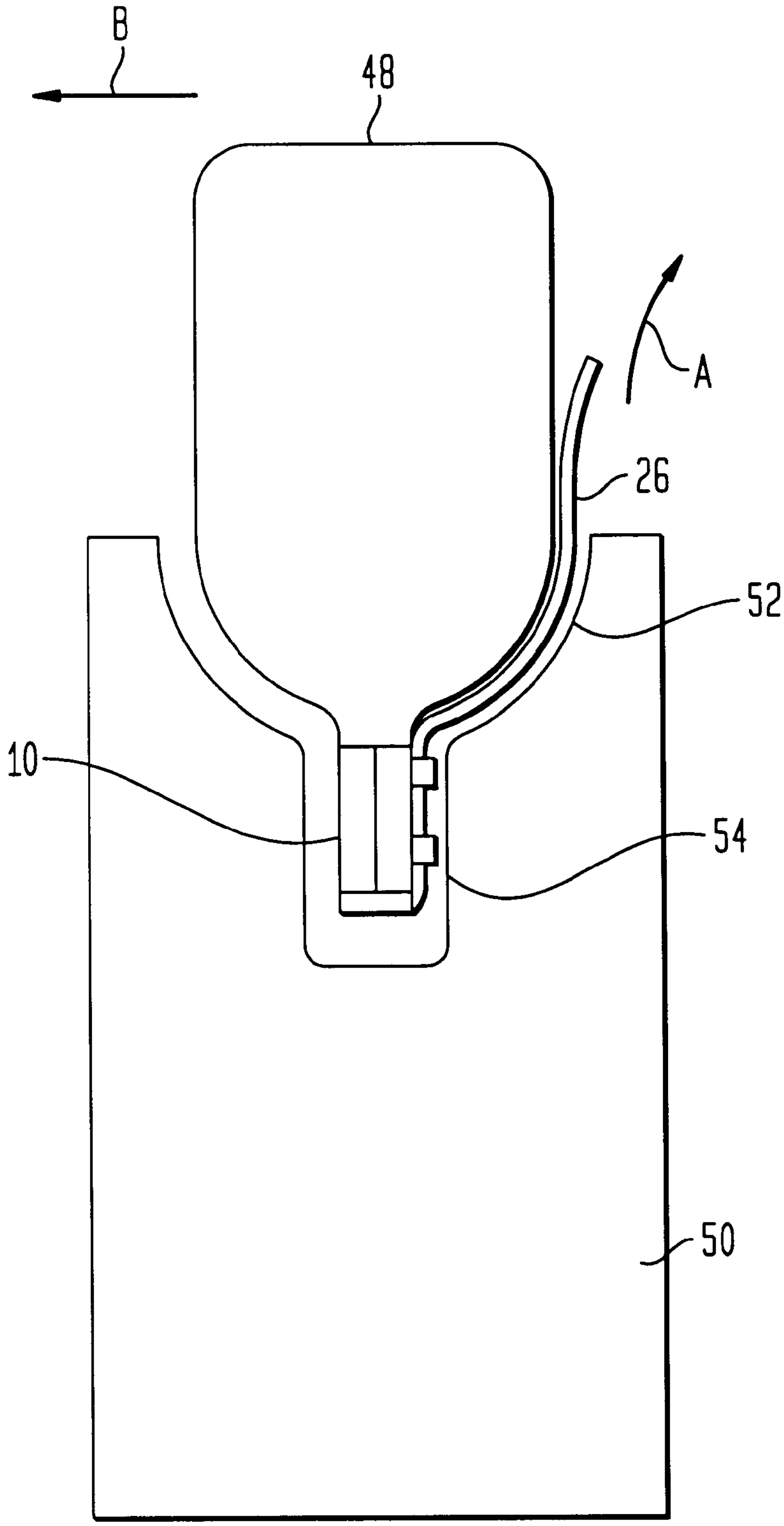
FIG. 11 shows a diagram illustrating the operation of the present invention in installing a bottle into a dispenser.

FIG. 11 is a diagram illustrating the operation of the present invention in installing a water bottle 48 in a dispensing unit 50. As shown in FIG. 11, a dispensing unit 50 typically has a cavity 52 shaped to receive the water bottle 50, and a well 54 for holding water for immediate use. In using the present invention, the user first removes the manufacturer's cap from the water bottle 48, and then mounts the water bottle cap 10 described above onto the bottle, making sure that the gate 18 is in its closed position. The user then inverts the bottle 48. Because the cap 10 is watertight, there is less need for speed and accuracy in installing the bottle 48 into the dispenser 50. Once the bottle 48 has been properly seated in the cavity, the user then pulls on the strap 26 in the direction generally indicated by arrow A to move the gate 18 into its open position, thereby allowing water to flow into the well 54. If the friction between the bottle 48, strap 26 and cavity 52 is sufficient to hinder the pulling of the strap 26, the user may apply pressure to the bottle 48 in the direction generally indicated by arrow B with one hand while pulling on the strap 26 with the other. After the water bottle 48 is expended, the user may reuse the bottle cap 10 by simply detaching the cap 10 from the bottle 48 and reattaching it onto another bottle. The user moves the gate 18 from its open position to its closed position using projection 22.

In the present embodiment of the invention, the pull strap 26 remains attached to the bottle cap 10 after the water bottle has been installed. The strap 26 may be draped over the rear face of the dispensing unit 50 so as to be unobtrusive. In an alternative embodiment of the invention, the strap 26 and gate 18 are completely removable from the cap. Thus, after the bottle has been installed in the dispensing unit, the user pulls the strap 26 and gate 18 completely free of the dispensing unit and stores them in a suitable location for reattachment to the cap 10 when a new bottle is installed.

It is contemplated that the present bottle cap will be sold separately from water bottles and be reused, as needed. However, it would also be possible to use the present bottle cap directly on new bottles of water. In that case, breakaway tabs could be used to hold the gate 18 in its initial position. Also, the cap could be sealed with a thin layer of plastic for added security. This thin layer of plastic would be torn away by the user before installing the water bottle.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

I claim:

1. A bottle cap, comprising:

a sleeve for receiving a neck of a bottle;

a gate slidably mounted in a frame across the top of the sleeve, the gate being slidable between a closed position in which the gate is watertight and an open position in which an aperture in the frame is exposed to allow the flow of liquid therethrough; and a strap extending from the gate for moving the gate from its closed position to its open position, wherein the sleeve includes a flap that is detachable from the sleeve to facilitate the mounting of the cap onto a bottle and reattachable to the sleeve to hold the sleeve in place.

2. The bottle cap of claim 1, wherein the flap is attached to the sleeve by interlocking ribs.

3. The bottle cap of claim 1, wherein the gate includes a projection that prevents the gate from being pulled out of the frame by butting up against a crossbar in the frame.

4. The bottle cap of claim 3, wherein the projection also functions as a knob for sliding the gate from its open position to its closed position.

5. The bottle cap of claim 1, further including a guide protruding from the sleeve for guiding the strap alongside the sleeve.

6. The bottle cap of claim 5, wherein the guide includes a slot for receiving the strap.

7. The bottle cap of claim 1, further including a shoulder at the base of the frame for receiving the strap.

8. The bottle cap of claim 1, wherein the strap includes a handle at its end.

9. A method for installing a bottle into a dispenser, comprising:

(a) attaching to a neck and opening of the bottle a cap having a gate slidably mounted in a frame, the gate being slidable between a closed position in which the gate is watertight and an open position in which an aperture in the frame is exposed to allow the flow of liquid therethrough, wherein the cap includes a sleeve dimensioned to fit closely around the bottle neck, and wherein the cap is attached to the bottle neck and opening by detaching and reattaching a detachable and reattachable flap on the sleeve;

(b) installing the bottle with the gate in its closed position into the dispenser; and (c) sliding the gate from its closed position to its open position.

* * * * *